United States Patent [19]

Jensen

[11] Patent Number: 5,246,394
[45] Date of Patent: Sep. 21, 1993

[54] OIL BOOM AND HOSE FOR TENSIONING THE SAME

[75] Inventor: Ulf J. Jensen, Smygehamn, Sweden
[73] Assignee: Trelleborg Industri AB, Trelleborg, Sweden
[21] Appl. No.: 882,124
[22] Filed: May 13, 1992
[30] Foreign Application Priority Data Apr. 16, 1992 [SE] Sweden .................. 9201233

[51] Int. Cl.⁵ ........................................ E02B 15/04
[52] U.S. Cl. ............................ 441/133; 114/270; 405/63
[58] Field of Search ...................... 405/60–72; 138/177, 118, 124–127; 114/270; 441/133, 130

[56] References Cited

U.S. PATENT DOCUMENTS

| 2,899,982 | 8/1959 | Harpfer ............... 138/126 |
| 4,238,260 | 12/1980 | Washkewicz ........ 138/125 |
| 4,273,160 | 6/1981 | Lowles ................ 138/124 |

FOREIGN PATENT DOCUMENTS 161867 6/1989 Norway .
8303628 10/1983 World Int. Prop. O. ........... 405/64

Primary Examiner—Edwin L. Swinehart
Attorney, Agent, or Firm—Beveridge, DeGrandi, Weilacher & Young

[57] ABSTRACT

An oil boom has a longitudinal hose-shaped floating body of cloth or fabric material, and a skirt, also of cloth or fabric material, extending from the floating body and equipped with sinkers. The floating body has internal inflatable hoses serving as distension elements. The inflatable hoses are fixed to the floating body and, in their inflated state, they are ring-shaped and they lie substantially in planes which are perpendicular to the axis of the floating body to distend it into hose shape. The inflatable hoses have an air-proofing layer of elastomeric material and a reinforcing structure. The reinforcing structure includes a tensile-stress-absorbing inner reinforcing layer and a hose-expansion-limiting outer reinforcing layer. The inner reinforcing layer is formed of substantially parallel reinforcing threads extending in the longitudinal direction of the hose. The outer reinforcing layer includes two groups of reinforcing threads extending helically in opposite directions at an obtuse reinforcement angle to each other around the hose.

14 Claims, 3 Drawing Sheets

OIL BOOM AND HOSE FOR TENSIONING THE SAME

BACKGROUND OF THE INVENTION

Norwegian Patent Specification 161,867 describes an oil boom conferring a number of advantages. When in use, this oil boom is in the form of an elongate hose-shaped floating body from which a skirt descends into the water, thus acting, together with the floating body, as a barrage against oil spills on or near the water surface. The skirt is maintained in its descending position by sinkers provided at the lower skirt edge. The floating body is maintained in a distended hose-shaped state by means of tensioning elements in the form of inflatable hoses disposed in pockets on the inside of the hose-shaped floating body. The oil boom is often manufactured in 50–100-m lengths, and several oil booms can be linked together to obtain an overall length of 500 m or even more.

A considerable advantage of this prior-art oil boom is that it can be produced as a flat unit and can be stored in a flat state on drums, whence it can be removed for mounting and subsequent placing on the site of use in a relatively short time. One drawback inherent in this oil boom is however that the inflatable hoses that are used for distending the floating body have insufficient rigidity in the inflated state and, therefore, do not always impart the requisite stability and distension capacity to the boom when in use. This is indeed a major shortcoming, since oil booms are often used under extreme weather conditions with high winds and rough sea. In case the distended floating body should collapse over a short stretch of its length, considerable amounts of collected oil may again be dissipated, which is of course detrimental to the oil clearing result and the environmental consequences of the oil spill.

This shortcoming of the known oil boom is primarily ascribable to the inflatable hoses which are used for distending the floating body and which are made of a pliable unextendible material, giving rise to creases or folds when the straight hoses are bent into ring shape during the distension of the oil boom. Moreover, when using such pliable unextendible material, sealing problems have also been encountered where the hoses are connected to couplings.

SUMMARY OF THE INVENTION

One object of the present invention therefore is to improve the known oil boom by reducing the tendency of the distended floating body to collapse as a result of a deformation of the hose means used for distending the floating body. Another object is to provide a new oil boom which is even easier and quicker to mount and place on the water surface. Yet another object is to reduce the risks of leakage at the couplings between gas supply hoses and the distension hose means or elements. A still further object of the invention is to provide an inflatable hose for use in oil booms for distending and stabilizing the floating bodies of the oil booms.

These and other objects of the invention are achieved by means of an oil boom of a design as recited in claim 1, and an inflatable hose of the design recited in claim 8. Especially preferred embodiments of the oil boom and the hose according to the invention are stated in the dependent claims.

An oil boom according to the invention comprises in conventional known manner a longitudinal, elongated tubular, hose-shaped floating body of cloth or fabric material, and a skirt, also of cloth or fabric material, extending from the floating body and equipped with sinkers. The floating body has a longitudinal axis and internal inflatable hoses serving as distension means. The inflatable hoses are fixed to the floating body and, when inflated, they are ring-shaped and they lie in a plane perpendicular to the axis of the floating body to distend it into tubular hose shape. In the oil boom according to the invention, the inflatable hoses have a tightening or air-proofing layer of elastomeric material and a reinforcing structure comprising a tensile-stress-absorbing inner reinforcing layer, and a hose-expansion-limiting outer reinforcing layer. The inner reinforcing layer is formed of substantially parallel reinforcing threads or cords extending in the longitudinal direction of the hose. The outer reinforcing layer comprises two groups of reinforcing threads or cords extending helically in opposite directions at an obtuse angle to each other around the hose. An inflatable hose of this design is also comprised by the invention for use in distending and stabilizing the floating body of an oil boom. In such a hose, the inner reinforcing layer is the innermost reinforcing layer, so the hose is devoid of any layer of reinforcing threads inside the inner reinforcing layer.

BRIEF DESCRIPTION OF THE DRAWINGS

The invention will be described in more detail hereinbelow with reference to the accompanying drawings, in which.

DESCRIPTION OF THE PREFERRED EMBODIMENT

Figure 1:
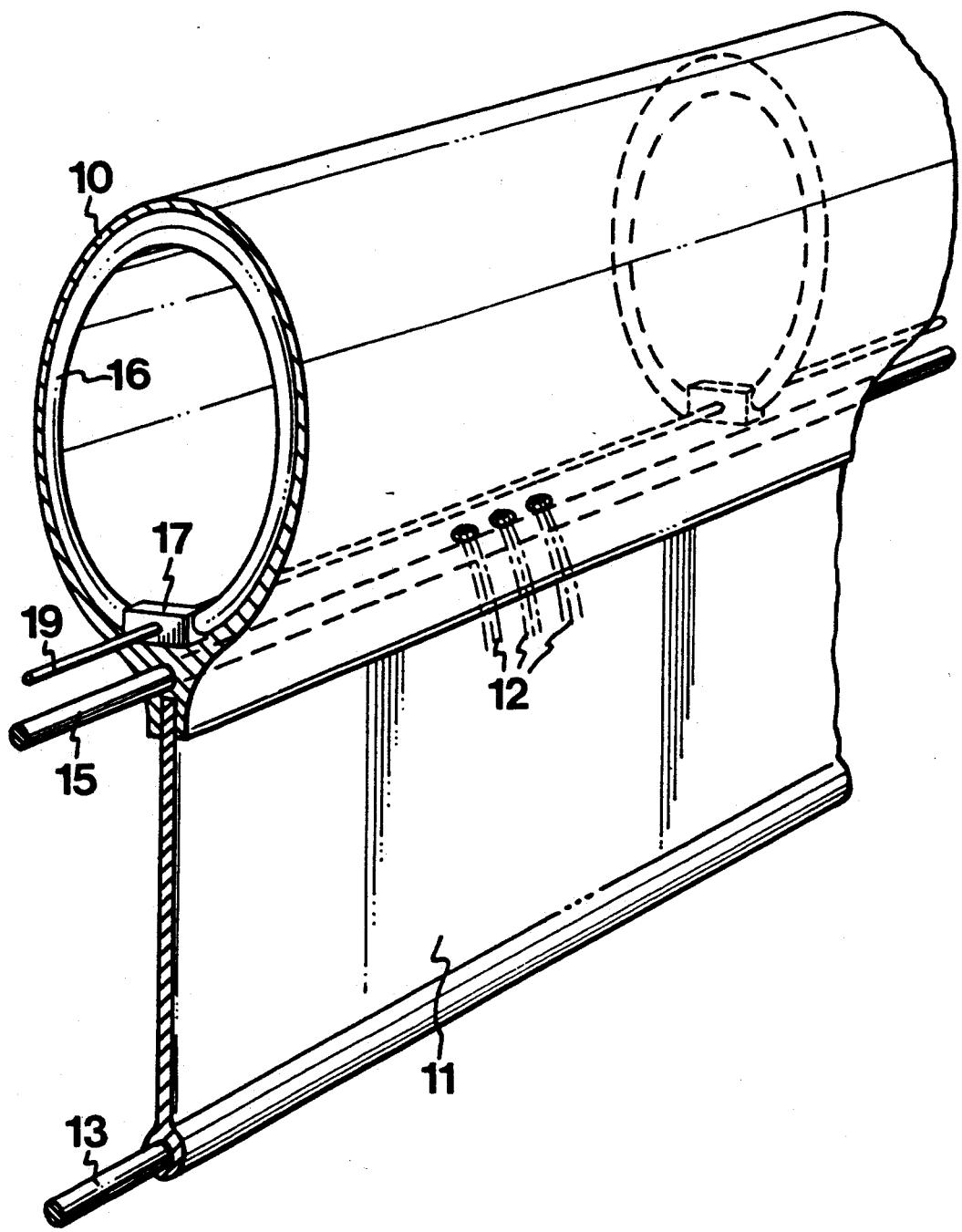
FIG. 1 is a perspective cross-sectional view of part of an oil boom, illustrated by way of example, according to the present invention.

An oil boom according to the present invention has a hose-shaped floating body 10 made of a pliable cloth or fabric material, such as a fabric-reinforced plastic or rubber cloth, and joined to a skirt 11 of cloth or fabric material, such as a fabric-reinforced plastic or rubber cloth, which is hanging down from the floating body when in use. The two parts, that is the floating body 10 and the skirt 11, can be joined together in any suitable manner. In the illustrated embodiment, the skirt 11 is sewn or welded between the edges of the long sides of the piece of cloth forming the hose-shaped floating body 10. To permit drainage of any water that may leak into the assembly, drain tubes 12 can be provided in the seam or joint connecting the floating body 10 to the skirt 11. At its lower end, the skirt 11 is provided with a sinker 13 which, in the illustrated embodiment, is a steel wire, but which may instead consist of separate sinker bodies distributed throughout the length of the boom. In the illustrated embodiment, a pullrope 15 is inserted in the area of the joint between the skirt 11 and the floating body 10. This pullrope suitably is a rope or band of e.g. polypropylene having an inherent buoyancy, or of aramide fibers.

Hoses 16 are provided in the interior of the floating body 10. These hoses can be fixed to the cloth material forming the floating body 10 by mechanical means, such as pockets, in the manner suggested in Norwegian Patent Specification 161,867 mentioned above. Other fixing techniques are however also conceivable within the scope of the invention. The hoses 16 are preferably fixed in such a manner as to be ring-shaped and to lie substantially in a plane perpendicular to the axial direction of the floating body in the inflated state thereof. The hoses 16 are bent into ring shape and joined at their ends to a coupling piece 17 provided with nipples (not shown) which project in opposite directions and on which the hose ends have been mounted. The hose ends are retained on the nipples by hose clips 18. Air supply tubes or hoses 19 are attached to the connecting pieces 17 and extend between successive coupling pieces 17, thus passing from one end of the oil boom to the other so that air or gas can be supplied from a source of compressed air or compressed gas at an optional end of the oil boom. Preferably, the tubes or hoses 19 are high-pressure tubes or hoses, because they must be able to withstand high internal pressures and because such tubes or hoses have a high bursting strength, i.e. resistance to bursting due to high inflation pressures. For attaching the hoses 19 to the coupling pieces, use is suitably made of conventional high-pressure hose couplings screwed on threaded pipe sockets on opposite sides of the coupling pieces 17.

Figure 3:
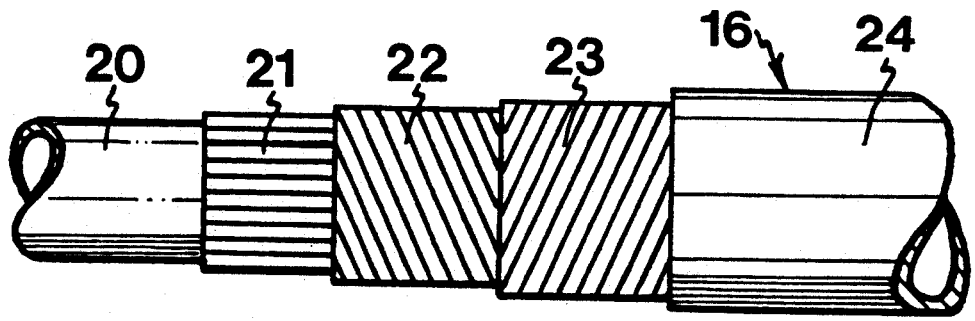
FIG. 3 shows an example of an inflatable hose according to the invention for use as a distension element in an oil boom according to the invention.

According to the invention, the hoses 16 used for distending and stabilizing the floating body 10 should be made of a special material imparting bending strength and stability to the inflated ring. FIG. 3 shows an example of such a hose. This hose has an inner tightening or air-proofing layer or liner 20, e.g. of a synthetic rubber material. On this inner layer is disposed an innermost reinforcement layer or ply 21 of a material which is capable of taking up tensile stresses, but which allows elongation of the hose to a certain extent. A preferred material is nylon cord threads which are thus placed at a reinforcing forcing angle of $V=0°$ (by "reinforcing angle" is meant the angle between the center line of the deflated hose and the cord threads projected perpendicular thereto). On the reinforcement ply 21 is placed a further reinforcing layer or ply 22 which is helically wound in one direction around the hose (reinforcing angle $V=60°-70°$, preferably $63°-68°$, most preferably $V=65°$). On the ply 22 is placed a further reinforcing layer or ply 23 having the same construction and reinforcing angle as the ply 22, but helically wound in the opposite direction. The two plies 22, 23 are wound at an obtuse angle to each other. On the ply 23 is finally provided an outer layer or cover 24, suitably also consisting of synthetic rubber. If so desired, an intermediate rubber layer can be disposed between the plies 21 and 22 and/or between the plies 22 and 23. These hoses 16 are devoid of any layer of reinforcing threads inside the layer 21.

Figure 4:
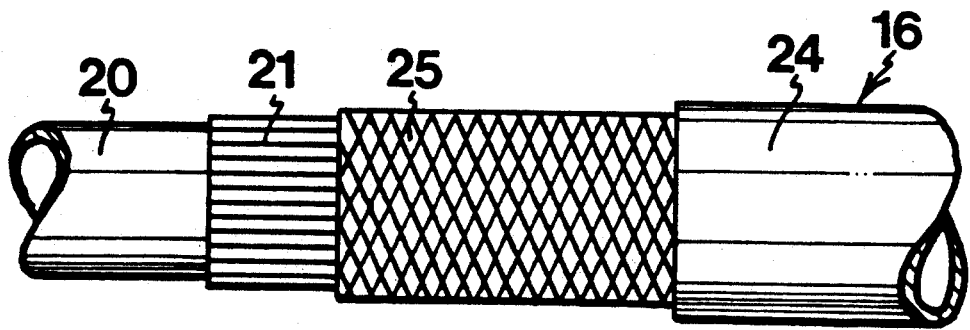
FIG. 4 similarly shows another example of such a hose.

FIG. 4, showing an alternative to this hose design of FIG. 3, differs therefrom only in that the plies 22 and 23 have been replaced by a single ply 25 braided on the hose at an obtuse braiding angle (reinforcing angle $V=60°-70°$, preferably $63°-68°$, most preferably $V=65°$, for each group of reinforcing threads). In this case too, it is possible to provide an intermediate rubber layer between the plies 21 and 25.

Figure 5:
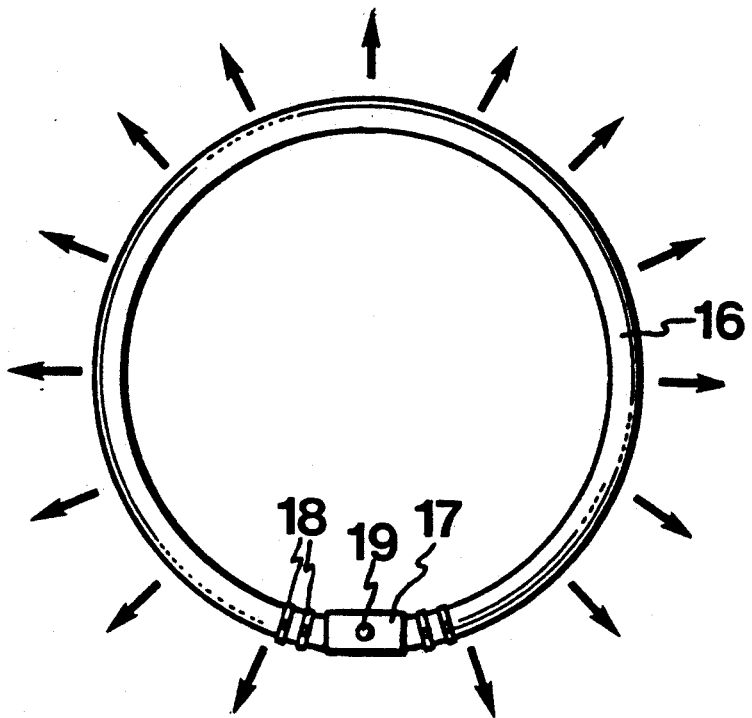
FIG. 5 illustrates the distension element or hose according to the invention when inflated.

The plies 22, 23 and 25, respectively, of this hose construction will tend to alter their reinforcement angle towards 54.7° (i.e. the so-called neutral angle), when the hose is subjected to an internal overpressure. During pressurization, the hose will tend to increase its length, which is however impeded to a considerable extent by the inner ply 21 counteracting such hose length increase. As a result, two forces will act in opposite directions, imparting rigidity to the hose as well as bearing capacity by radially outwardly directed forces, as illustrated by the arrows in FIG. 5. An optimum result is obtained if the reinforcing ply 21 (the axial reinforcement) consists of a cord material having a higher extensibility than the cord material of the plies 22, 23 and 25, respectively, such that the inner ply 21 withstands a greater elongation at break and allows the ring-shaped hose to expand to a greater extent in the radial direction without any adverse effect on it. This difference in extensibility of the reinforcing material of the ply 21 and of the plies 22, 23, 25, respectively, also facilitates bending the hose into ring shape without any formation of creases or folds on the inner radius of the hose (see FIG. 5).

By the increased rigidity achieved according to the invention in the hoses 16 bent into ring shape for distending the floating body 10, the oil boom will have a considerably improved ability to maintain its intended shape. This enhanced distending ability and stability can be used, either for obtaining greater boom stability or for reducing the number of ring-shaped bodies 16 required throughout the length of the oil boom.

In an oil boom according to the invention, the hose-shaped floating body may have a diameter of about 0.8–1.4 m, entailing lengths of about 2.5–4.4 m for the hoses 16. The hoses 16 may have a diameter of e.g. 50–100 mm. The distance between successive rings throughout the floating body 10 may be varied, but suitably is 1.5–2 m. The width of the skirt, i.e. the distance it descends from the floating body, may be e.g. 1.5 m or more.

Figure 2:
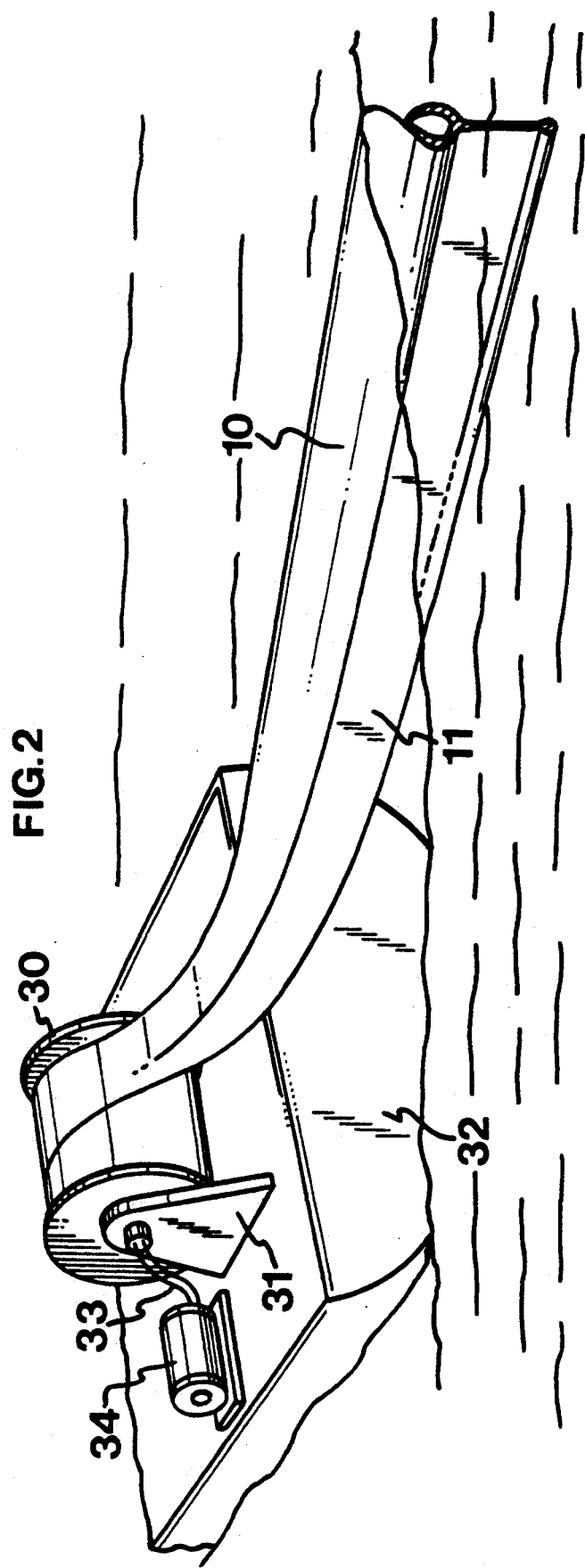
FIG. 2 illustrates how the oil boom can be placed on a water surface by being unrolled from a supply drum mounted on a vessel.

FIG. 2 shows how a deflated oil boom can be wound on a drum 30 which is rotatably mounted on brackets 31 at the stern of a vessel 32. Through the drum shaft compressed-air tubes or hoses 33 can be extended to a compressor 34 or other air supply means. The tubes 33 are connected to the hoses 19. When the oil boom is to be paid out from the hose drum, it may be advantageous to subject the entire system to an internal overpressure for a certain period of time before paying out the boom, e.g. for 20 min, since the inflation of the boom during the paying-out process will then be carried out in a considerably shorter time and, above all, successively during the entire paying-out process. A neighboring vessel is suitably used for paying out the boom. Compressed air can be supplied from one end of the boom, but it is also possible to supply the compressed air or gas from both ends. Whether the compressed air or gas is supplied from one or both ends of the boom, the inflation of the different ring-shaped hoses 16 will occur successively as the paying-out process proceeds. If the tubes 19 have a sufficient capacity to withstand compression when winding up the boom, that is if they are high-pressure tubes having a high resistance to compression, inflation can be effected from the vessel carrying the drum 30. A drum having e.g. a diameter of 3 m and a width of 2 m may hold oil boom lengths of about 400 m. By this arrangement, it is possible to place oil booms, also in rough sea, both quickly and expediently.

What I claim and desire to secure by Letters patent is:

1. Oil boom comprising a longitudinal elongated tubular floating body of cloth material, and a skirt, also made of cloth material, extending from said floating body and provided with sinkers, said floating body having a longitudinal axis and internal distension means in the form of inflatable hoses fixed to the floating body, said inflatable hoses, when in the inflated state, being ring-shaped and lying substantially in a plane perpendicular to said axis so as to distend the floating body into tubular shape, and being connectible by a gas supply hose to a gas supply source, said inflatable hoses forming said distension means comprising a tightening layer of elastomeric material and a reinforcing structure having a tensile-stress-absorbing inner reinforcing layer of substantially parallel reinforcing threads extending in the longitudinal direction of the hose, and an outer reinforcing layer limiting the extent of expansion of the hose and including two groups of reinforcing threads extending helically in opposite directions at an obtuse reinforcing angle around the hose.

2. Oil boom according to claim 1, wherein said two groups of reinforcing threads of said hose-expansion-limiting outer reinforcing layer extend as separate superposed plies.

3. Oil boom according to claim 1, wherein said two groups of reinforcing threads of said hose-expansion-limiting outer reinforcing layer together form a braided reinforcing layer.

4. Oil boom according to claim 1, wherein the reinforcing threads of said hose-expansion-limiting outer reinforcing layer extend helically around the hose at an obtuse reinforcing angle of 60°-70°, measured in the deflated state of the hose.

5. Oil boom according to claim 4, wherein said reinforcing angle is 63°-68°.

6. Oil boom according to claim 5, wherein said reinforcing angle is about 65°.

7. Oil boom according to claim 1, wherein the tensile-stress-absorbing inner reinforcing layer comprises reinforcing threads of an extensibility exceeding that of the reinforcing threads of said hose-expansion-limiting outer reinforcing layer.

8. Inflatable hose designed for distending and stabilizing an oil boom and having a tightening layer of elastomeric material and a reinforcing structure, said reinforcing structure comprising a tensile-stress-absorbing inner reinforcing layer of substantially parallel reinforcing threads extending in the longitudinal direction of the hose, and a hose-expansion-limiting outer reinforcing layer comprising two groups of reinforcing threads extending helically in opposite directions at an obtuse reinforcing angle around the hose, said inner reinforcing layer being an innermost reinforcing layer so that said hose is devoid of any reinforcing threads inside the inner reinforcing layer.

9. Hose according to claim 8, wherein said two groups of reinforcing threads of said hose-expansion-limiting outer reinforcing layer extend as separate superposed plies.

10. Hose according to claim 8, wherein said two groups of reinforcing threads of said hose-expansion-limiting outer reinforcing layer together form a braided reinforcing layer.

11. Hose according to claim 8, wherein the reinforcing threads of said hose-expansion-limiting outer reinforcing layer extend helically around the hose at an obtuse reinforcing angle of 60°-70°, measured in the deflated state of the hose.

12. Hose according to claim 11, wherein said reinforcing angle is 63°-68°.

13. Hose according to claim 12, wherein said reinforcing angle is about 65°.

14. Hose according to claim 8, wherein the tensile-stress-absorbing inner reinforcing layer comprises reinforcing threads of an extensibility exceeding that of the reinforcing threads of said hose-expansion-limiting outer reinforcing layer.

* * * * *